United States Patent
Pack et al.

(10) Patent No.: US 8,367,780 B2
(45) Date of Patent: Feb. 5, 2013

(54) ALIPHATIC POLYESTER COPOLYMER, METHOD FOR PREPARING THE SAME AND POLYLACTIC ACID RESIN COMPOSITION USING THE SAME

(75) Inventors: Ji Won Pack, Uiwang-si (KR); Byeong Do Lee, Uiwang-si (KR); Chang Do Jung, Uiwang-si (KR); Hyung Tak Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/631,164

(22) Filed: Dec. 4, 2009

(65) Prior Publication Data

US 2010/0152362 A1 Jun. 17, 2010

(30) Foreign Application Priority Data

Dec. 11, 2008 (KR) .............................. 2008-126156

(51) Int. Cl.
*C08G 65/32* (2006.01)
(52) U.S. Cl. ........ 525/408; 525/403; 525/410; 525/411; 525/413; 525/415; 525/450; 525/523; 525/533
(58) Field of Classification Search .................. 525/403, 525/408, 410, 411, 413, 415, 523, 533
See application file for complete search history.

(56) References Cited

U.S. PATENT DOCUMENTS

| | | | | |
|---|---|---|---|---|
| 4,115,328 A | * | 9/1978 | Bozzi et al. | 523/416 |
| 4,521,570 A | * | 6/1985 | Watanabe et al. | 525/415 |
| 4,804,718 A | * | 2/1989 | Dervan et al. | 525/418 |
| 5,824,751 A | | 10/1998 | Hori et al. | |
| 2003/0232088 A1 | * | 12/2003 | Huang et al. | 424/487 |
| 2008/0300379 A1 | | 12/2008 | Mullet et al. | |

FOREIGN PATENT DOCUMENTS

| | | |
|---|---|---|
| EP | 0723983 A | 7/1996 |
| JP | 07-082369 A | 3/1995 |
| NL | 2002910 | 3/2010 |

OTHER PUBLICATIONS

Acar, I.; Durmus, A.; Ozgumus, S.; Journal of Applied Polymer Science, vol. 106, p. 4180-4191, 2007.*
Kint, D.P.R.; Alla, A.; Deloret, E; Campos, J.L.; Munoz-Guerra, S.; Polymer, vol. 44, p. 1321-1330, 2003.*
Dutch Search Report and Written Opinion in counterpart Dutch Application No. 2003882, dated Feb. 11, 2011, pp. 1-10.

* cited by examiner

*Primary Examiner* — Robert Jones, Jr.
(74) *Attorney, Agent, or Firm* — Summa, Additon & Ashe, P.A.

(57) ABSTRACT

A block or graft copolymer including a thermoplastic resin segment and as an aliphatic polyester segment is provided. The copolymer can be used as a compatibilizer for a resin alloy comprising polylactic acid, which can reduce the consumption of petroleum raw materials.

9 Claims, No Drawings

ALIPHATIC POLYESTER COPOLYMER, METHOD FOR PREPARING THE SAME AND POLYLACTIC ACID RESIN COMPOSITION USING THE SAME

CROSS REFERENCE TO RELATED APPLICATIONS

This application claims priority from Korean Patent Application No. 2008-126156, filed Dec. 11, 2008 in the Korean Intellectual Property Office, the disclosure of which is incorporated herein by reference in its entirety.

FIELD OF THE INVENTION

The present invention relates to an aliphatic polyester copolymer, a method for preparing the same, and a polylactic acid resin composition using the same.

BACKGROUND OF THE INVENTION

Due to the rapid increase of petroleum prices and environmental pollution problems caused by waste polymers, there is increased interest in plant-derived polymer materials. Plant-derived polymer materials generally do not impose a heavy environmental burden and can be recycled as they are obtained from biomasses. Of particular interest are biodegradable polymers capable of being naturally decomposed in soil or landfills.

Among biodegradable polymers, aliphatic polyester polymers have been the most studied since the aliphatic polyester polymers have excellent workability and easily controlled decomposition properties. In particular, polylactic acid (PLA) has a 100,000 ton-scale market all over the world, and the uses of the same are expanding to include food containers and packaging materials and fields in which general plastics for electronic appliance cases and the like have been used. Until recently, polylactic acid resins have mainly been used in disposable products, for example, food containers, wraps, films and the like.

However, thin film products formed of existing polylactic acid resins can be easily damaged when they are molded from the existing polylactic acid resins since the existing polylactic acid resins can have insufficient moldability, mechanical strength and heat resistance. In particular, the shape of molded products formed of existing polylactic acid resins can be deformed if exposed to an external temperature of 60° C. or higher since the existing polylactic acid resins have low high temperature resistance.

Recently, research has focused on blending general-purpose resins having high heat resistance and mechanical properties with polylactic acid. Such methods have gained attention since these methods can suppress the consumption of general-purpose resins derived from petroleum raw materials and thus can reduce environmental burdens associated with the same by lowering carbonic acid gas and combustion heat generated when recycling general-purpose resins.

SUMMARY OF THE INVENTION

The present invention provides a novel aliphatic polyester copolymer.

The present invention further provides an aliphatic polyester copolymer that can have excellent compatibility with polylactic acid as well as resins that are not compatible with polylactic acid.

The present invention further provides a novel method for preparing the aliphatic polyester copolymer.

The present invention further provides a compatibilizer using the aliphatic polyester copolymer.

The present invention further provides a polylactic acid resin composition that can have excellent heat resistance and mechanical strength using the aliphatic polyester copolymer as a compatibilizer.

The present invention further provides a polylactic acid resin composition capable of suppressing the consumption of petroleum raw materials by enabling uniform mixing of polylactic acid and resins that are not compatible with polylactic acid.

An aspect of the present invention relates to an aliphatic polyester copolymer. The aliphatic polyester copolymer comprises an aliphatic polyester segment (a) and a thermoplastic resin segment (b) that is not an aliphatic polyester. In an exemplary embodiment, the aliphatic polyester segment (a) comprises one or more cyclic monomers selected from lactides, lactones, cyclic carbonates, cyclic anhydrides, thiolactones, or a combination thereof. In another exemplary embodiment, the aliphatic polyester segment (a) comprises L-lactide, D-lactide, glycolide, e-caprolactone, or a combination thereof.

The thermoplastic resin segment (b) may comprise a bisphenol-based segment. The thermoplastic resin segment (b) can have a number-average molecular weight of about 1,100 to about 20,000.

In an exemplary embodiment, the thermoplastic resin segment (b) can have two or more hydroxyl groups and can have reactive epoxy groups or phenolic hydroxyl groups at both ends of a molecular chain.

The aliphatic polyester copolymer of the present invention may be a block copolymer.

In another exemplary embodiment, the aliphatic polyester copolymer of the present invention may be a graft copolymer. If the aliphatic polyester copolymer of the present invention is a graft copolymer, the copolymer can comprise an aliphatic polyester segment (a) grafted onto a thermoplastic resin segment (b) as a main chain.

In an exemplary embodiment, the aliphatic polyester copolymer can have a number-average molecular weight of about 5,000 to about 300,000.

According to an exemplary embodiment the aliphatic polyester copolymer can have a weight ratio of the aliphatic polyester segment (a) to the thermoplastic resin segment (b) of about 1:99 to about 99:1.

Another aspect of the present invention relates to a method of preparing an aliphatic polyester copolymer. The method comprises the steps of mixing a bisphenol-based resin and one or more cyclic monomers selected from lactides, lactones, cyclic carbonates, cyclic anhydrides, thiolactones, or a combination thereof, and polymerizing the mixture in the presence of an organometallic catalyst.

The organometallic catalyst may be selected from Sn-based catalysts, Zn-based catalysts, Al-based catalysts or a combination thereof.

In an exemplary embodiment, the bisphenol-based resin may be a bisphenol epoxy resin.

A further aspect of the present invention relates to new uses of the aliphatic polyester copolymer. The aliphatic polyester copolymer may be used as a compatibilizer of a resin alloy comprising polylactic acid.

A still further aspect of the present invention relates to a polylactic acid resin composition which can include the aliphatic polyester copolymer as a compatibilizer. The resin composition can comprise about 1 to about 99% by weight of polylactic acid (A); about 99 to about 1% by weight of a thermoplastic resin (B) that is not polylactic acid; and about 0.1 to about 20 parts by weight of the aliphatic polyester copolymer (C) of the invention as described herein, based on about 100 parts by weight of a base resin comprising the polylactic acid (A) and the thermoplastic resin (B).

In an exemplary embodiment, examples of the thermoplastic resin (B) that is not polylactic acid may comprise polyester resins, polyamide resins, polycarbonate resins, styrene-based resins, polyolefin resins, and the like, and combinations thereof. However, the thermoplastic resins are not necessarily limited thereto.

In another exemplary embodiment, the resin composition may further comprise about 5 to about 50 parts by weight of a natural fiber based on about 100 parts by weight of the base resin. In a further exemplary embodiment, the resin composition may further comprise about 0.01 to about 5 parts by weight of a coupling agent based on about 100 parts by weight of the base resin.

In a still further exemplary embodiment, the resin composition may further comprise one or more additives, such as but not limited to a flame retardant, an antioxidant, a benzophenone type and/or amine type weather resisting agent, a release agent, a coloring agent, a ultraviolet screening agent, a filler, a nucleating agent, a plasticizer, a natural fiber, a coupling agent, an impact modifier, a thermal stabilizer, and the like, and combinations thereof.

In an exemplary embodiment, when the thermoplastic resin (B) is a polycarbonate resin, the polylactic acid resin composition may have a heat deflection temperature of about 90 to about 180° C. as measured in accordance with ASTM D648, and a flexural strength and a flexural modulus of about 760 to about 1,500 kgf/cm² and about 25,000 to about 50,000 kgf/cm², respectively, as measured in accordance with ASTM D790.

A still further aspect of the present invention relates to an article molded from the polylactic acid resin composition.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Aliphatic Polyester Copolymer

The aliphatic polyester copolymer of the present invention comprises an aliphatic polyester segment (a) and a thermoplastic resin segment (b) that is not an aliphatic polyester.

The aliphatic polyester segment (a) can include one or more cyclic monomers. Examples of the cyclic monomer may include without limitation lactides, lactones, cyclic carbonates, cyclic anhydrides, thiolactones, and the like, and combinations thereof, but the present invention is not necessarily limited thereto. These cyclic monomers may be used singly or in the form of combinations of two or more thereof.

In an exemplary embodiment, a monomer of the aliphatic polyester segment (a) may be represented by the following Chemical Formula 1, Chemical Formula 2, or a combination thereof.

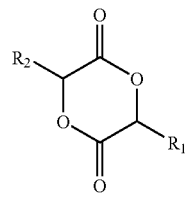

[Chemical Formula 1]

wherein each $R_1$ and $R_2$ can be the same or different and is independently hydrogen or C1-C4 alkyl.

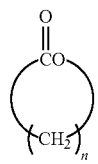

[Chemical Formula 2]

wherein n is 2 to 5.

Examples of the compound represented by the foregoing Chemical Formula 1 may include without limitation L-lactide, D-lactide, D,L-lactide, glycolide, and the like, and combinations thereof.

Examples of the compound represented by the foregoing Chemical Formula 2 may include without limitation e-caprolactone and the like.

Monomers represented by the foregoing Chemical Formula 1 or Chemical Formula 2 may be used singly or in the form of combinations of two or more thereof.

The thermoplastic resin segment (b) may comprise a bisphenol-based segment. The bisphenol-based segment can include a plurality of bisphenol units as the main chain of a molecule, can have two or more hydroxyl groups and can have epoxy groups or phenolic hydroxyl groups at both ends or termini of the molecule. Bisphenol-based components may be prepared by the skilled artisan using conventional techniques without undue experimentation, such as a taffy process, a fusion process, and the like.

The thermoplastic resin segment (b) may have a number-average molecular weight of about 1,100 to about 20,000. In an exemplary embodiment, the thermoplastic resin segment (b) may have a number-average molecular weight of about 1,500 to about 19,000, for example about 2,000 to about 18,000, as another example about 3,000 to about 15,000, and as another example about 5,000 to about 10,000.

The aliphatic polyester copolymer of the present invention may be a block copolymer. In an exemplary embodiment, the block copolymer can be a double block copolymer. In another exemplary embodiment, the block copolymer can be a triple block copolymer. When the block copolymer is a triple block copolymer, a chain length of the aliphatic polyester segment (a) may have a number-average molecular weight of about 5,000 to about 150,000. In an exemplary embodiment, the block copolymer can have a glass transition temperature (Tg) of the aliphatic polyester (a) and a glass transition temperature (Tg) of the thermoplastic resin (b).

In a further exemplary embodiment, the aliphatic polyester copolymer of the present invention may be a graft copolymer. When the aliphatic polyester copolymer is a graft copolymer, the graft copolymer may have a structure in which an aliphatic polyester segment (a) is grafted on a thermoplastic resin segment (b) as a main chain. In this case, a chain length of the aliphatic polyester segment (a) may have a number-average molecular weight of about 1,000 to about 10,000.

Each segment of the aliphatic polyester (a) and the thermoplastic resin (b) may have a number-average molecular weight of about 3000 or more. If each segment of the aliphatic polyester (a) and the thermoplastic resin (b) has a low molecular weight, an effect of each segment as a compatibilizer may be reduced. Accordingly, dispersibility, heat resistance and mechanical properties of a finally obtained resin composition may be lowered, and handling characteristics of the resin composition may deteriorate when preparing a block or graft copolymer.

The aliphatic polyester copolymer of the present invention can have a number-average molecular weight of about 5,000 to about 300,000. In an exemplary embodiment, the aliphatic polyester copolymer can have a number-average molecular weight of about 7,000 to about 200,000. In another exemplary embodiment, the aliphatic polyester copolymer can have a number-average molecular weight of about 5,000 to about 90,000. In a further exemplary embodiment, the aliphatic polyester copolymer can have a number-average molecular weight of about 100,000 to about 250,000.

In the aliphatic polyester copolymer, a weight ratio of the aliphatic polyester segment (a) to the thermoplastic resin segment (b) can be about 1:99 to about 99:1. In an exemplary embodiment, a weight ratio of the aliphatic polyester segment (a) to the thermoplastic resin segment (b) can be about 20:80 to about 80:20. In another exemplary embodiment, a weight ratio of the aliphatic polyester segment (a) to the thermoplastic resin segment (b) can be about 30:70 to about 70:30. Such an aliphatic polyester copolymer may be used as a compatibilizer of a resin alloy comprising polylactic acid since the aliphatic polyester copolymer can enable polylactic acid to be uniformly melted and mixed with general-purpose resins that are not otherwise substantially compatible with polylactic acid. A polylactic acid resin composition having the compatibilizer added thereto may have improved impact characteristics, mechanical properties and heat resistance and may help reduce the consumption of petroleum raw materials.

Method of Making an Aliphatic Polyester Copolymer

Another aspect of the present invention relates to a method of making an aliphatic polyester copolymer. The method comprises the steps of mixing a cyclic monomer with a bisphenol-based resin and polymerizing the mixture in the presence of an organometallic catalyst. When the cyclic monomer is mixed with the bisphenol-based resin, an aliphatic polyester segment may block- or graft-copolymerize with a bisphenol-based segment since hydroxyl groups present in a main chain of the bisphenol-based segment can function as an initiator and thus the hydroxyl groups can effectively function as a ring-opening polymerization initiator of the cyclic monomer. In order to prepare a copolymer having a high block or graft degree and a high molecular weight, water contained in the raw materials of the cyclic monomer and the thermoplastic resin is removed as much as possible.

Exemplary cyclic monomers include without limitation lactides, lactones, cyclic carbonates, cyclic anhydrides, thiolactones, and the like, and combinations thereof.

Exemplary organometallic catalysts include without limitation Sn-based catalysts, Zn-based catalysts, Al-based catalysts and the like, and combinations thereof. Exemplary Sn-based catalysts include without limitation stannous octoate, stannic chloride, stannous oxide, stannous octylester, stannous chloride dehydrate, tetraphenyl tin, and the like, and combinations thereof. Exemplary Zn-based catalysts include without limitation zinc powder, diethyl zinc, zinc octoate, zinc chloride, zinc oxide, and the like, and combinations thereof. Exemplary Al-based catalysts include without limitation aluminum chloride, aluminum ethoxide, and the like, and combinations thereof. The catalyst can be added in an amount of about 0.001 to about 1 part by weight, for example about 0.001 to about 0.5 parts by weight, based on about 100 parts by weight of the total weight of the cyclic monomer.

In an exemplary embodiment, the bisphenol-based resin may be a bisphenol epoxy resin.

The cyclic monomer and bisphenol-based resin can be mixed at a weight ratio of about 1:99 to about 99:1, for example about 20:80 to about 80:20.

In an exemplary embodiment, the aliphatic polyester copolymer may be prepared by heating a mixture of the cyclic monomer and the bisphenol-based resin to a temperature of about 60 to about 230° C. while stirring the mixture, adding a polymerization catalyst to the mixture, and performing a polymerization reaction of the mixture at a temperature of about 60 to about 230° C. for about 1 to about 12 hours to form a copolymer. In an exemplary embodiment, non-reacted monomer may be removed from the copolymer after the polymerization reaction.

Polylactic Acid Resin Composition

A further aspect of the present invention relates to a polylactic acid resin composition including the aliphatic polyester copolymer.

In an exemplary embodiment, the resin composition may comprise about 1 to about 99% by weight of polylactic acid (A); about 99 to about 1% by weight of a thermoplastic resin (B) that is not polylactic acid; and about 0.1 to about 20 parts by weight of the aliphatic polyester copolymer (C) described herein, based on about 100 parts by weight of a base resin including the polylactic acid (A) and the thermoplastic resin (B). In an exemplary embodiment, the resin composition can include about 1 to about 20 parts by weight of the aliphatic polyester copolymer (C) based on about 100 parts by weight of the base resin. The foregoing ranges of components of the resin composition can provide a desirable balance of physical properties such as heat resistance and mechanical strength.

The polylactic acid (A) may be prepared by esterification using lactic acid as a monomer. In an exemplary embodiment, the polylactic acid (A) may include without limitation L-lactic acid, D-lactic acid, L,D-lactic acid, or a combination thereof. The molecular weight of the polylactic acid (A) is not particularly limited, but in exemplary embodiments, the polylactic acid (A) can have a number-average molecular weight of about 10,000 or higher, for example, about 80,000 or higher. Further, combinations of two or more polylactic acids may be used.

Examples of the thermoplastic resin (B) that is not polylactic acid may include without limitation polyester resins, polyamide resins, polycarbonate resins, styrene-based resins, polyolefin resins, and the like, and combinations thereof, but the thermoplastic resins are not necessarily limited thereto.

In another exemplary embodiment, the resin composition may further comprise about 5 to about 50 parts by weight of a natural fiber based on about 100 parts by weight of the base resin. In an exemplary embodiment, a natural fiber comprising about 95% or more of cellulose may be used. Although the length of the natural fiber is not particularly limited, the natural fiber can have a length of about 5 to about 50 mm, and an average diameter of about 0.1 to about 50 µm.

In a further exemplary embodiment, the resin composition may further comprise about 0.01 to about 5 parts by weight of a coupling agent based on about 100 parts by weight of the base resin. Silane-based coupling agents may be used as the coupling agent.

In other exemplary embodiment, the resin composition may further comprise one or more additives. Exemplary additives include without limitation flame retardants, antioxidants, benzophenone type and/or amine type weather resistance agents, release agents, coloring agents, ultraviolet screening agents, filler, nucleating agents, plasticizers, natural fibers, coupling agents, impact modifiers, thermal stabilizers, and the like, and combinations thereof. Exemplary plasticizers include without limitation acetyl monoglyceride (AMG), citrate, and the like, and combinations thereof.

In one exemplary embodiment, when the thermoplastic resin (B) is a polycarbonate resin, the polylactic acid resin composition may have a heat deflection temperature of about 90 to about 180° C. as measured in accordance with ASTM D648, and a flexural strength and a flexural modulus of about 760 to about 1,500 kgf/cm$^2$ and about 25,000 to about 50,000 kgf/cm$^2$, respectively, as measured in accordance with ASTM D790.

Another aspect of the present invention relates to an article prepared using the polylactic acid resin composition of the invention.

The polylactic acid resin composition may be prepared in the form of pellets by mixing the components of the present invention optionally with one or more additives and then melting and extruding the mixture in an extruder. Articles can be prepared using the pellets by injection and/or extrusion molding processes.

The present invention will be well understood by the following examples. The following examples of the present invention are only for illustrative purposes and are not construed as being limited to the scope of the present invention defined by the appended claims.

EXAMPLE 1

Preparation of Aliphatic Polyester Copolymer

After injecting 4 g of a bisphenol A type epoxy resin (YD-017 having a molecular weight of 9,000 g/mol manufactured by KUKDO Chemical Co., Ltd.) and 15 g of L-lactide into a glass polymerization tube and substituting it with a purge gas (nitrogen gas), the purged mixture was heated to 190° C. while stirring the mixture. When the two materials are externally uniformly mixed at 190° C., 4.2 mg of stannous octoate as a polymerization catalyst is injected into the glass polymerization tube, and the resulting mixture is maintained at 190° C. for 5 hours. After separating a polymer from the glass tube, the polymer is dissolved into 50 ml of chloroform to produce a chloroform polymer solution. The chloroform polymer solution is stirred into 800 ml of a methanol solution and simultaneously precipitated, and thus non-reacted monomer is removed. 17 g of a copolymer EB1 is obtained in which polylactic acid is introduced into a main chain of the bisphenol A type resin in the form of a graft. The yield of the copolymer is 87%, and the molecular weight and molecular weight distribution (MWD) of the copolymer measured by gel permeation chromatography (GPC) are 190,000 g/mol and 3.6, respectively. The glass transition temperature (Tg) of the copolymer is 48° C. as determined using differential scanning calorimetry (DSC) analysis, and the melting temperature (Tm) thereof is not observed.

The graft ratio of the copolymer is 20%, determined using proton NMR (1H NMR), integrating chemical shifts of proton peaks around hydroxyl groups present in the main chain of the bisphenol A type resin after the reaction, and comparing the integrated chemical shifts of the proton peaks.

Preparation of Polylactic Acid Resin Composition

A master batch is prepared by mixing 10% by weight of a polylactic acid resin (4032D having a number-average molecular weight of 100,000 g/mol, D-lactic acid unit of 1% and a melting point of 175° C. manufactured by Nature-Works), 10% by weight of a natural fiber, 0.5% by weight of a coupling agent, and 10% by weight of the foregoing synthesized aliphatic polyester copolymer as a compatibilizer, and processing the mixture. Then, an extrudate is manufactured in the form of pellets by further adding 50% by weight of polycarbonate resin (PANLITE L-1225WX manufactured by TEIJIN Co., Ltd. of Japan) and 40% by weight of polylactic acid resin in the master batch and then extruding the mixture from an ordinary twin screw extruder in a temperature range of 180 to 240° C.

After drying the pellets at 80° C. for 4 hours, samples for testing physical properties are manufactured by injection molding the pellets into ASTM dumbbell specimens using an injection molding machine having a 6 oz injection capacity at a cylinder temperature of 210 to 230° C., a mold temperature of 100° C. and a molding cycle time of 30 seconds.

Physical properties of the manufactured samples for testing physical properties are measured by the following methods and are represented in Table 1.

Evaluation Methods of Physical Properties (1) Heat Deflection Temperature (HDT) is measured in accordance with ASTM D648.

(2) Flexural strength is measured in accordance with ASTM D790.

(3) Flexural modulus is measured in accordance with ASTM D790.

(4) Tensile strength is measured in accordance with ASTM D638.

EXAMPLE 2

An aliphatic polyester copolymer is prepared in the same manner as in Example 1 except that 7 g of a bisphenol A type epoxy resin (YD-017 having a molecular weight of 9,000 g/mol manufactured by KUKDO Chemical Co., Ltd.), 10 g of L-lactide, and 2.8 mg of stannous octoate as a polymerization catalyst are used. 15 g of a copolymer EB2 in which polylactic acid is introduced into a main chain of the bisphenol A type resin in the form of a graft is obtained. The yield of the copolymer is 88%, and the molecular weight and molecular weight distribution thereof measured by gel permeation chromatography are 65,000 g/mol and 5.6, respectively. The glass transition temperature (Tg) of the copolymer is 50° C. as determined using differential scanning calorimetry analysis, and the melting temperature (Tm) thereof is not observed.

A polylactic acid resin composition is prepared in the same manner as in Example 1 except that the aliphatic polyester copolymer EB2 is used as represented in the following Table 1.

EXAMPLE 3

A polylactic acid resin composition is prepared in the same manner as in Example 1 except that the aliphatic polyester copolymer EB2 prepared in Example 2 is used and the amounts of the components in the resin composition are changed as represented in the following Table 1.

EXAMPLE 4

A polylactic acid resin composition is prepared in the same manner as in Example 1 except that the aliphatic polyester copolymer EB2 prepared in Example 2 is used and the amounts of the components in the resin composition are changed as represented in the following Table 1.

EXAMPLE 5

An aliphatic polyester copolymer is prepared in the same manner as in Example 1 except that 7 g of a bisphenol A type epoxy resin (YD-017 having a molecular weight of 9,000 g/mol manufactured by KUKDO Chemical Co., Ltd.), 4 g of L-lactide, and 1.3 mg of stannous octoate as a polymerization catalyst are used. 10 g of a copolymer EB3 in which polylactic acid is introduced into a main chain of the bisphenol A type resin in the form of a graft is obtained. The yield of the copolymer is 90%, and the molecular weight and molecular weight distribution (MWD) thereof measured by gel permeation chromatography (GPC) are 21,000 g/mol and 6.6, respectively. The glass transition temperature (Tg) of the copolymer is 58° C. as determined using differential scanning calorimetry (DSC) analysis, and the melting temperature (Tm) thereof is not observed.

A polylactic acid resin composition is prepared in the same manner as in Example 1 except that the aliphatic polyester copolymer EB3 is used as represented in the following Table 1.

COMPARATIVE EXAMPLE 1

An aliphatic polyester copolymer is prepared in the same manner as in Example 1 except that 7 g of bisphenol A type epoxy resin (YD-011 having a molecular weight of 1,000 g/mol manufactured by KUKDO Chemical Co., Ltd.) and 10 g of L-lactide are used. 16 g of a copolymer EB4 in which polylactic acid is introduced into a main chain of the bisphenol A type resin in the form of a graft is obtained. The yield of the copolymer is 88%, and the molecular weight and molecular weight distribution of the copolymer measured by gel permeation chromatography are 92,000 g/mol and 3.6, respectively. The glass transition temperature (Tg) of the copolymer is 51° C. as determined using differential scanning calorimetry analysis, and the melting temperature (Tm) of the copolymer is observed at 170° C.

A polylactic acid resin composition is prepared in the same manner as in Example 1 except that the aliphatic polyester copolymer EB4 is used as represented in the following Table 1.

COMPARATIVE EXAMPLE 2

An aliphatic polyester copolymer is prepared in the same manner as in Example 1 except that 7 g of bisphenol A type resin (Sigma-Aldrich) and 10 g of L-lactide are used. 16 g of a copolymer EB5 in which polylactic acid is introduced into a main chain of the bisphenol A type resin is obtained. The yield of the copolymer is 94%, and the molecular weight and molecular weight distribution of the copolymer measured by gel permeation chromatography are 78,000 g/mol and 2.7, respectively. The glass transition temperature (Tg) of the copolymer is 50° C. as determined using differential scanning calorimetry analysis, and the melting temperature (Tm) of the copolymer is observed at 178° C.

A polylactic acid resin composition is prepared in the same manner as in Example 1 except that the aliphatic polyester copolymer EB5 is used as represented in the following Table 1.

COMPARATIVE EXAMPLE 3

An aliphatic polyester copolymer is prepared in the same manner as in Example 1 except that 7 g of bisphenol A diglycidyl ether (Sigma-Aldrich) and 10 g of L-lactide are used. 15 g of a copolymer EB6 in which polylactic acid is introduced into a main chain of the bisphenol A diglycidyl ether is obtained. The yield of the copolymer is 88%, and the molecular weight and molecular weight distribution of the copolymer measured by gel permeation chromatography are 105,000 g/mol and 3.1, respectively. The glass transition temperature (Tg) of the copolymer is 50° C. as determined using differential scanning calorimetry analysis, and the melting temperature (Tm) of the copolymer is observed at 175° C.

A polylactic acid resin composition is prepared in the same manner as in Example 1 except that the aliphatic polyester copolymer EB6 is used as represented in the following Table 1.

COMPARATIVE EXAMPLE 4

A polylactic acid resin composition is prepared in the same manner as in Example 1 except that the aliphatic polyester copolymer EB1 prepared in Example 1 is used and the amounts of the components in the resin composition are changed as represented in the following Table 1.

TABLE 1

| | | Example | | | | | Comparative Example | | | |
|---|---|---|---|---|---|---|---|---|---|---|
| Item | | 1 | 2 | 3 | 4 | 5 | 1 | 2 | 3 | 4 |
| Base resin | Polylactic acid | 50 | 50 | 50 | 50 | 50 | 50 | 50 | 50 | 50 |
| | Polycarbonate | 50 | 50 | 50 | 50 | 50 | 50 | 50 | 50 | 50 |
| Natural fiber | | 10 | 10 | 10 | 10 | 10 | 10 | 10 | 10 | 10 |
| Coupling agent | | 0.5 | 0.5 | 0.5 | 0.5 | 0.5 | 0.5 | 0.5 | 0.5 | 0.5 |
| Copolymer | EB1 | 10 | — | — | — | — | — | — | — | 30 |
| | EB2 | — | 5 | 10 | 20 | — | — | — | — | — |
| | EB3 | — | — | — | — | 10 | — | — | — | — |
| | EB4 | — | — | — | — | — | 10 | — | — | — |
| | EB5 | — | — | — | — | — | — | 10 | — | — |
| | EB6 | — | — | — | — | — | — | — | 10 | — |
| Heat deflection temperature (18.5 kgf) (° C.) | | 109 | 113 | 125 | 120 | 111 | 63 | 57 | 58 | 48 |
| Flexural strength (kgf/cm$^2$) | | 760 | 850 | 1,100 | 980 | 870 | 600 | 530 | 540 | 480 |
| Flexural modulus (kgf/cm$^2$) | | 30,000 | 34,000 | 39,000 | 35,000 | 30,000 | 22,000 | 20,000 | 2,200 | 1,800 |
| Tensile strength (kgf/cm$^2$) | | 600 | 670 | 750 | 700 | 660 | 580 | 520 | 530 | 470 |

Tests are performed while varying molecular weight and percent by weight of the copolymer for identical compositions of a base resin, a natural fiber and a coupling agent and processing conditions thereof and adding only a block or graft copolymer of polylactic acid and bisphenol A type resin as a compatibilizer in Examples 1 to 5 as represented in the foregoing Table 1. Comparing thermal and mechanical properties of the resin compositions, the thermal and mechanical properties of the polylactic acid and the polycarbonate resin composition are improved when using the copolymers EB1 to EB3 of polylactic acid and bisphenol A type resin, wherein the bisphenol A type resin in the molecules of the copolymers has a molecular weight of 9,000 g/mol.

On the other hand, adding polylactic acid derivatives did not influence thermal and mechanical properties of the polylactic acid and the polycarbonate resin composition when the bisphenol A type resin in the molecules of the copolymers has a molecular weight of not higher than 1,000 g/mol as described in Comparative Examples 1 to 3.

Example 3, which includes 10% by weight of the copolymer EB2 having a molecular weight of 65,000 g/mol, exhibits the best thermal and mechanical properties including a heat deflection temperature of 125° C. and a flexural strength of 1100 kgf/cm$^2$. Example 1, which includes the copolymer EB1 having a molecular weight of 190,000 g/mol (about three times higher than that of the copolymer EB2), exhibits slight changes in heat deflection temperature and mechanical properties such as flexural strength and the like. It is believed that the role of the copolymer EB1 as a compatibilizer is somewhat restricted since movement of the copolymer EB1 to the interface of polycarbonate and polylactic acid is lower than that of the copolymer EB2 due to an increase in molecular weight of polylactic acid within the copolymer EB1 (although the molecular weight of the bisphenol A type resin in molecules of the copolymer EB1 is 9,000 g/mole, which is the same as that of the copolymer EB2).

There is little change in heat deflection temperature and mechanical properties when using polylactic acid derivatives prepared using bisphenol A type epoxy resin (a molecular weight of 1,000 g/mol) (Comparative Example 1), bisphenol A type resin (Comparative Example 2) and bisphenol A diglycidyl ether (Comparative Example 3) as initiators. It is believed that the polylactic acid derivatives could not function as a compatibilizer for the polylactic acid and the polycarbonate when melting and mixing the two resins since the molecular weight of the bisphenol A type resin within the polylactic acid derivatives that are injected and expected to function as a compatibilizer is lower than that of polylactic acid.

According to the present invention, there can be provided an environmentally friendly plant-derived resin composition by developing a novel compatibilizer for improving compatibility in blending of polylactic acid and general-purpose resins and by improving heat resistance and mechanical properties of a molten mixture of the general-purpose resins and polylactic acid in which the novel compatibilizer is added.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the to invention being defined in the claims.

What is claimed is:

1. An aliphatic polyester copolymer comprising (a) an aliphatic polyester segment and (b) a thermoplastic resin segment that is not an aliphatic polyester, wherein said thermoplastic resin segment (b) has two or more hydroxyl groups and has reactive epoxy groups or phenolic hydroxyl groups at both ends of a molecular chain and wherein said aliphatic polyester copolymer has a number-average molecular weight of about 5,000 to about 300,000 and wherein said thermoplastic resin segment (b) has a number-average molecular weight of about 1,100 to about 20,000, and wherein the aliphatic polyester segment (a) comprises a monomer represented by the following Chemical Formula 1

[Chemical Formula 1]

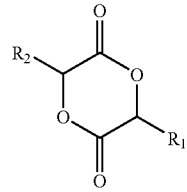

wherein each $R_1$ and $R_2$ is the same or different and is independently hydrogen or C1-C4 alkyl.

2. The aliphatic polyester copolymer of claim 1, wherein said monomer comprises L-lactide, D-lactide, D,L-lactide, glycolide, or a combination thereof.

3. The aliphatic polyester copolymer of claim 1, wherein said thermoplastic resin segment (b) comprises a bisphenol-based segment.

4. The aliphatic polyester copolymer of claim 1, wherein said aliphatic polyester copolymer is a block copolymer.

5. The aliphatic polyester copolymer of claim 1, wherein said aliphatic polyester copolymer is a graft copolymer.

6. The aliphatic polyester copolymer of claim 5, wherein said aliphatic polyester copolymer comprises an aliphatic polyester segment (a) grafted onto a thermoplastic resin segment (b) as a main chain.

7. The aliphatic polyester copolymer of claim 1, wherein the aliphatic polyester copolymer comprises a weight ratio of the aliphatic polyester segment (a) to the thermoplastic resin segment (b) of about 1:99 to about 99:1.

8. The aliphatic polyester copolymer of claim 1, wherein said aliphatic polyester copolymer has a number-average molecular weight of about 100,000 to about 300,000.

9. The aliphatic polyester copolymer of claim 1, wherein said aliphatic polyester copolymer has a number-average molecular weight of 190,000 to about 300,000.

* * * * *

UNITED STATES PATENT AND TRADEMARK OFFICE
CERTIFICATE OF CORRECTION

PATENT NO. : 8,367,780 B2
APPLICATION NO. : 12/631164
DATED : February 5, 2013
INVENTOR(S) : Ji Won Pack et al.

It is certified that error appears in the above-identified patent and that said Letters Patent is hereby corrected as shown below:

In the Specification

Column 2, Line 23, reads: "L-lactide, D-lactide, glycolide, e-caprolactone, or a combi-"
and should read: "L-lactide, D-lactide, D,L-lactide, glycolide, e-caprolactone, or a combi-"

Signed and Sealed this
Third Day of September, 2013

Teresa Stanek Rea
*Acting Director of the United States Patent and Trademark Office*